United States Patent
Brick (10) Patent No.: US 10,904,450 B2
(45) Date of Patent: Jan. 26, 2021

(54) METHOD AND OPTOELECTRONIC LIGHTING DEVICE FOR LIGHTING A FACE OF A PERSON, CAMERA, AND MOBILE TERMINAL

(71) Applicant: OSRAM Opto Semiconductors GmbH, Regensburg (DE)

(72) Inventor: Peter Brick, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 16/083,114

(22) PCT Filed: Mar. 9, 2017

(86) PCT No.: PCT/EP2017/055597
§ 371 (c)(1),
(2) Date: Sep. 7, 2018

(87) PCT Pub. No.: WO2017/153544
PCT Pub. Date: Sep. 14, 2017

(65) Prior Publication Data
US 2019/0098194 A1    Mar. 28, 2019

(30) Foreign Application Priority Data
Mar. 10, 2016 (DE) .................... 10 2016 104 383

(51) Int. Cl.
*H04N 5/235* (2006.01)
*H04N 5/225* (2006.01)
(Continued)

(52) U.S. Cl.
CPC ....... *H04N 5/2354* (2013.01); *G06K 9/00255* (2013.01); *G06K 9/00604* (2013.01);
(Continued)

(58) Field of Classification Search
CPC .............. H04N 5/2354; H04N 5/2256; H04N 5/23219; H04N 5/332; G06K 9/00255; G06K 9/00604
See application file for complete search history.

(56) References Cited

U.S. PATENT DOCUMENTS 7,340,159 B2    3/2008  Sugiura et al.
7,639,940 B2    12/2009 Yoda et al.
(Continued)

FOREIGN PATENT DOCUMENTS

CN    102576790 A    7/2012
CN    105242484 A    1/2016
(Continued)

OTHER PUBLICATIONS

The First Office Action dated Apr. 1, 2020, of counterpart Chinese Application No. 201780016303.4, along with an English translation.

*Primary Examiner* — Nicholas G Giles
(74) *Attorney, Agent, or Firm* — DLA Piper LLP (US)

(57) ABSTRACT

A method of illuminating a face of a person including recording a first image imaging the face of the person, determining an eye region in the imaged face, and illuminating the face of the person, a first region corresponding to the eye region determined, of the face being illuminated such that dazzling of the eyes of the person can be reduced.

17 Claims, 6 Drawing Sheets

(51) Int. Cl.
*H04N 5/232* (2006.01)
*H04N 5/33* (2006.01)
*G06K 9/00* (2006.01)
*G09G 3/34* (2006.01)

(52) U.S. Cl.
CPC ....... *H04N 5/2256* (2013.01); *H04N 5/23219* (2013.01); *H04N 5/332* (2013.01); *G09G 3/3406* (2013.01)

(56) References Cited

U.S. PATENT DOCUMENTS

| | | |
|---|---|---|
| 7,920,205 B2 | 4/2011 | Awazu |
| 2008/0106637 A1* | 5/2008 | Nakao .................. H04N 5/2256 348/371 |
| 2009/0185358 A1 | 7/2009 | Liu et al. |
| 2012/0108291 A1 | 5/2012 | Sumisaki |
| 2012/0189291 A1 | 7/2012 | von Malm et al. |
| 2012/0248492 A1 | 10/2012 | Muller et al. |
| 2013/0201653 A1 | 8/2013 | Shoemaker et al. |
| 2014/0226002 A1* | 8/2014 | Metzler .................. G01C 1/04 348/78 |
| 2015/0002735 A1* | 1/2015 | Moskovchenko ... H04N 5/2354 348/370 |

FOREIGN PATENT DOCUMENTS

| | | |
|---|---|---|
| DE | 10 2005 021 808 | 11/2006 |
| JP | 2002-31833 | 1/2002 |
| JP | 2012-213047 | 11/2012 |

\* cited by examiner

METHOD AND OPTOELECTRONIC LIGHTING DEVICE FOR LIGHTING A FACE OF A PERSON, CAMERA, AND MOBILE TERMINAL

TECHNICAL FIELD

This disclosure relates to a method of illuminating a face of a person, an optoelectronic lighting device that illuminates a face of a person, and a camera that records a face of a person. The disclosure further relates to a mobile terminal.

BACKGROUND

Flashlights of cameras, cell phones or video cameras often cause dazzling of the persons being photographed. One possible cause is an excessively high luminance of the flashlight.

A pixelated emitter is known, for example, from DE 10 2014 101 896 A1.

There is thus a need to provide efficient illumination of a face of a person, which can reduce dazzling of eyes of a person to be photographed.

SUMMARY

I provide a method of illuminating a face of a person including recording a first image imaging the face of the person, determining an eye region in the imaged face, and illuminating the face of the person, a first region corresponding to the eye region determined, of the face being illuminated such that dazzling of the eyes of the person can be reduced.

I also provide an optoelectronic lighting device that illuminates a face of a person including a recording instrument that records a first image, imaging the face, of the person, a processing instrument that determines an eye region in the imaged face, and an optoelectronic illumination instrument that illuminates the face of the person, the illumination instrument configured to illuminate a first region corresponding to the eye region determined of the face such that dazzling of the eyes of the person can be reduced.

I further provide a camera that records a face of a person including an image sensor that records an image of a face of a person, an objective that images the face onto the image sensor, and the optoelectronic lighting device.

| List of References | |
|---|---|
| 101 | recording |
| 103 | determination |
| 105 | illumination |
| 107 | illumination |
| 201 | optoelectronic lighting device |
| 203 | recording instrument |
| 205 | processing instrument |
| 207 | optoelectronic illumination instrument |
| 301 | camera |
| 303 | image sensor |
| 305 | objective |
| 401 | mobile terminal |
| 501 | optoelectronic semiconductor chip |
| 503 | optical imaging system |
| 505 | image plane |
| 507 | grid cell |
| 509 | less brightly illuminated grid cell |
| 511 | illumination light |
| 701 | pixelated emitter |
| 703 | light-emitting pixel |
| 705 | light-emitting pixel with reduced illuminance |
| 801 | backlighting |
| 803 | liquid-crystal display |
| 805 | pixel of the liquid-crystal display |
| 807 | darkened pixel of the liquid-crystal display |
| 901 | first image |
| 903 | eye region |
| 905 | imaged face |
| 1001 | a recording region corresponding to the first image 901 |
| 1003 | first region |
| 1005 | real face |
| 1101 | abscissa |
| 1105 | ordinate |
| 1113 to 1117 | curve profiles |
| 1201 | abscissa |
| 1203 | ordinate |
| 1205 | graphical profile of the eye sensitivity |

DETAILED DESCRIPTION

I provide a method of illuminating a face of a person, comprising the following steps: recording a first image imaging the face of the person, determining an eye region in the imaged face, illuminating the face of the person, a first region, corresponding to the eye region determined, of the face being illuminated such that dazzling of the eyes of the person can be reduced.

I also provide an optoelectronic lighting device that illuminates a face of a person comprising:

a recording instrument that records a first image, imaging the face, of the person, a processing instrument that determines an eye region in the imaged face, and an optoelectronic illumination instrument that illuminates the face of the person, the illumination instrument configured to illuminate a first region, corresponding to the eye region determined, of the face such that dazzling of the eyes of the person can be reduced.

I further provide a camera that records a face of a person comprising:

an image sensor that records an image of a face of a person, an objective that images the face onto the image sensor, and the optoelectronic lighting device that illuminates a face of a person.

I still further provide a mobile terminal, in particular a cell phone, comprising the optoelectronic lighting device that illuminates a face of a person or the camera that records a face of a person.

My method, device, camera and mobile terminal are based on the discovery that the eye region of the person is illuminated such that dazzling of the eyes of the person can be reduced. To know precisely where the illumination needs to be correspondingly adapted in the face, a global reduction of the illuminance over the entire face could, for example, lead to underexposure, provision being made that the eye region to be illuminated is determined by first recording the face of the person so that a first image of the person, imaging the face, is recorded. In this first image, the eye region is determined. This eye region present in the recorded image corresponds to an eye region, the first region, in the face of the person in the real world. It is therefore advantageously possible in an efficient manner to determine the position in the face of the person needing to be illuminated in a way to reduce or even avoid dazzling of the eyes of the person.

In this way, in particular, the technical advantage is achieved that a concept for efficient illumination of a face of a person is provided. In particular, in this way the technical advantage is achieved that dazzling of the eyes of the person can be reduced or even avoided.

The eye region corresponds, for example, to the two pupils. A pupil diameter is, for example, 8 mm depending on the light conditions. The eye region thus comprises, in particular, two subregions of the face, each of which comprises one of the two pupils. The subregion is, for example, a circle which comprises the pupil and which, for example, has a diameter of at most 8 mm. The subregion has, for example, the shape of an ellipse.

The eye region is, for example, a circle whose center lies between the two pupils and whose diameter is equal to an eye spacing, for example, 20 cm. The eye region is, for example, an ellipse which comprises the two pupils.

In general, the eye region is thus a region of the face comprising the two eyes.

Recording the first image, imaging the face, of the person comprises compilation of a three-dimensional profile of an environment comprising the person, the eye region being determined in the three-dimensional profile. This means that an environment is three-dimensionally scanned or sampled to compile the three-dimensional profile. The three-dimensional profile then corresponds to an image of the person. The three-dimensional profile is then analyzed to determine or detect the eye region.

Correspondingly, therefore, the recording instrument may be configured to compile a three-dimensional profile of an environment comprising the person, the processing instrument being configured to determine the eye region in the three-dimensional profile.

Here, in particular, an environment means an environment of the lighting device, in particular of the camera, in particular of the mobile terminal.

The environment is, for example, a scene comprising the person. A scene refers, in particular, to an arrangement of one or more objects in three-dimensional space. For example, an object is a person. An object is, for example, an animal. An object is, for example, an article. An object is, for example, a nonliving three-dimensional body. An object is, for example, a plant. An object is, for example, a tree.

The compilation of the three-dimensional profile, which may also be referred to as a three-dimensional picture of the environment comprises, for example, a time-of-flight measurement of laser pulses emitted into the environment. This means that laser pulses are emitted into the environment, laser pulses reflected by the environment being detected, a transmission time and a detection time being determined, the time of flight of the laser pulses being determined on the basis of the transmission time and the detection time.

The optoelectronic illumination instrument may comprise a laser that emits laser pulses. The laser is, for example, a pulsed laser. The laser is, for example, a continuous-wave laser, in which case a modulator is then provided to generate laser pulses on the basis of the continuous laser radiation. The modulator comprises, for example, a chopper and/or an acousto-optic modulator.

The recording instrument may have a detector for laser pulses.

The processing instrument may be configured to carry out a time-of-flight measurement of laser pulses by using the laser and the detector to compile the three-dimensional profile of the environment.

The first region of the face may be illuminated with a lower illuminance than a second region of the face, which is different from the first region.

In this way, in particular, the technical advantage is achieved that dazzling can be reduced or even avoided particularly efficiently. This thus means, in particular, that an illuminance in the eye region, i.e. the first region, of the person is lowered or reduced in comparison with the second region of the face. The first region is thus illuminated less strongly than the second region. The reduction or lowering of the illuminance advantageously achieves the effect that dazzling of the eyes of the person can be reduced or even avoided.

To avoid dazzling of the eyes, for example, a value of at most 10000 $cd/m^2$ is provided for the luminance on which the illuminance is based.

The first region may be illuminated with a spectral distribution whose global maximum lies at a wavelength which lies outside a wavelength range of 535 nm to 575 nm, in particular 515 nm to 590 nm, preferably 515 nm to 595 nm. The global maximum lies, for example, at 510 nm. The global maximum lies, for example, between 500 nm and 520 nm.

In this way, in particular, the technical advantage is achieved that the eyes of the person are illuminated with a wavelength which lies outside a maximum spectral sensitivity of the eye. In this way, furthermore, the technical advantage is achieved that an illuminance for the eye region need not necessarily have to be lowered to reduce or avoid dazzling, if the eyes are not very sensitive in the spectral distribution of the illumination. In this way, for example, underexposure of the face can be avoided so that underexposed recordings of the face can be avoided.

A pixelated emitter having a plurality of individually drivable light-emitting pixels may be used for the illumination, light-emitting pixels that illuminate the first region being driven such that dazzling of the eyes of the person by the light-emitting pixels that illuminate the first region can be reduced.

In this way, in particular, the technical advantage is achieved that efficient illumination of the face of the person can be carried out such that dazzling of the eyes of the person can be reduced. This is because the first region can be correspondingly illuminated efficiently owing to the provision of the individually drivable light-emitting pixels. This thus means that those light-emitting pixels that illuminate the first region are correspondingly driven so that, for example, they illuminate the first region with a lower illuminance than the second region of the face. An intensity of the light emitted by the light-emitting pixels that illuminate the first region is thus lower relative to the light intensity of the light emitted by those light-emitting pixels that illuminate the second region.

The pixelated emitter thus comprises a plurality of light-emitting pixels that can be driven individually, i.e. in particular independently of one another.

A pixel may also be referred to as an image point.

A light-emitting pixel comprises, in particular, a pn junction. When an electrical voltage is applied to such a pn junction, the pn junction emits light.

This thus means that a light-emitting pixel has, for example, a plurality of semiconductor layers comprising an n-doped and a p-doped semiconductor layer. In the simplest case, one n-doped and one p-doped semiconductor layer are provided.

For example, the light-emitting pixels comprise a common n-doped semiconductor layer and respectively their own p-doped semiconductor layer.

The pixelated emitter may comprise a semiconductor layer sequence having a main extent plane, the semiconductor layer sequence comprising the following:
    an n-conducting (i.e. in particular an n-doped) semiconductor layer formed in one piece,
    an active zone, and
    a p-conducting (i.e. in particular a p-doped) semiconductor layer subdivided into a multiplicity of regions laterally spaced apart from one another, each region together with the n-conducting semiconductor layer forming precisely one image point (i.e. precisely one pixel), and
    an n-contacting layer configured to be electrically conductive and of which a bottom face adjoins the top face of the n-conducting semiconductor layer,
    a p-contacting layer configured to be electrically conductive and of which a bottom face adjoins the top face of the p-conducting semiconductor layer, and
    a third insulation layer configured to be electrically insulating and, for example, essentially extends transversely or transversely to the main extent direction of the semiconductor layer sequence,
    the third insulation layer being arranged between the p-conducting semiconductor layer and the n-contacting layer and directly adjoining all side faces of the n-contacting layer and all side faces of the p-conducting semiconductor layer,
    the n-contacting layer being formed continuously and enclosing the image points (i.e. the pixels), for example, in the manner of a frame, and
    the top face of the n-conducting semiconductor layer has a greater distance from the bottom face of the n-conducting semiconductor layer in the region of the image points (i.e. of the pixels) than in the region of the n-contacting layer.

The image points (i.e. the pixels) may be enclosed on all lateral lying side flanks by the third insulation layer.

The pixelated emitter may be configured as a light-emitting diode chip.

At least some of the light-emitting pixels may be configured to emit light of different wavelengths.

In this way, in particular, the technical advantage is achieved that the face of the person, in particular the first region or the second region, can be illuminated with a predetermined spectral intensity distribution. For example, with a spectral distribution whose global maximum lies at a wavelength that lies outside a wavelength range of 535 nm to 575 nm, in particular 515 nm to 590 nm, preferably 515 nm to 595 nm.

That the pixels are configured to emit light of different wavelengths means, for example, that the pixels comprise different converter layers or converter materials. For example, the pixels that emit different wavelengths have differently configured semiconductor layers. For example, the semiconductor layers differ in their layer thickness and/or in their semiconductor material.

A liquid-crystal display illuminated by backlighting may be used for the illumination, the liquid-crystal display being driven such that dazzling of the eyes of the person by the luminous liquid-crystal display can be reduced.

In this way, in particular, the technical advantage is achieved that the illumination can be carried out efficiently such that dazzling of the eyes of the person can be reduced. This is because in this way regions of the liquid-crystal display, which would otherwise illuminate the eyes of the person, can be deliberately and efficiently dimmed or darkened. This thus means that the liquid-crystal display is darkened locally or pixel-wise. This thus means, in particular, that an optical transparency of the liquid-crystal display is locally reduced.

An optical imaging system may be arranged in a beam path of illumination light corresponding to the illumination, the illumination light being imaged onto the face of the person by the optical imaging system such that a local minimum of the imaged illumination light lies in the first region.

In this way, in particular, the technical advantage is achieved that the first region of the face can correspondingly be illuminated efficiently so that dazzling of the eyes of the person can be reduced.

The imaging system may comprise one or more of the following optical elements: zoom objective, liquid lens that adjusts different focal lengths. The liquid lens is based, for example, on the principle of electrowetting. In electrowetting, use is made, inter alia, of the fact that a wetting angle of a liquid relative to a further liquid and/or to a substrate can be adjusted by an electrical voltage so that by adjustment of the wetting angle, a particular focal length for the lens can be adjusted and/or an optical axis of the lens can be tilted or displaced. The effect achieved by tilting the optical axis is, for example, that imaging can be tilted or displaced so that a local minimum of illumination light can be displaced in the imaging plane. This means that this advantageously makes it possible to image the local minimum of the illumination light at a particular position in the imaging plane.

In this way, in particular, the technical advantage is achieved that different focal lengths can be adjusted efficiently so that the illumination light can be imaged efficiently onto the face of the person.

The recording of the first image may comprise illumination of the face by UV light and/or IR light.

In this way, in particular, the technical advantage is achieved that the first image can be recorded efficiently. Human eyes are generally not very sensitive in the UV range or infrared range, with the result that no dazzling of the eyes is caused by illuminating the face by UV light and/or IR light. Image sensors of a camera, on the other hand, are generally more sensitive than the human eye in the UV range or IR range, with the result that the image sensors can record the image efficiently. For example, efficient focusing of the face is made possible by illuminating the face by UV light and/or IR light, with the result that a sharp first image can be recorded.

Technical functionalities of the optoelectronic lighting device that illuminate a face of a person are similarly found from corresponding technical functionalities of the method of illuminating a face of a person, and vice versa. This thus means, in particular, that method features derive correspondingly from device features of the optoelectronic lighting device, and vice versa.

The illumination instrument may be configured to illuminate the first region of the face with a lower illuminance than a second region of the face, which is different from the first region.

The illumination instrument may be configured to illuminate the first region with a spectral distribution whose global maximum lies at a wavelength that lies outside a wavelength range of 535 nm to 575 nm, in particular 515 nm to 590 nm, preferably 515 nm to 595 nm.

The illumination instrument may comprise a pixelated emitter having a plurality of individually drivable light-emitting pixels, and a drive instrument that individually drives the light-emitting pixels, which is configured to drive light-emitting pixels that illuminate the first region such that dazzling of the eyes of the person by the light-emitting pixels that illuminate the first region can be reduced.

The illumination instrument may comprise a liquid-crystal display that can be illuminated by backlighting, and a drive instrument that drives the liquid-crystal display, the drive instrument configured to drive the liquid-crystal display such that dazzling of the eyes of the person by the liquid-crystal display illuminated by the backlighting can be reduced.

A drive instrument that individually drives the light-emitting pixels of the pixelated emitter and/or drives the liquid-crystal display is provided.

An optical imaging system may be arranged in a beam path of illumination light corresponding to the illumination, the imaging system configured to image the illumination light onto the face of the person such that a local minimum of the imaged illumination light lies in the first region.

The imaging system may comprise one or more of the following optical elements: zoom objective, liquid lens that adjusts different focal lengths.

The image sensor may comprise the recording instrument. This thus means, in particular, that the image sensor of the camera is used to record a first image, imaging the face, of the person.

The illumination instrument may comprise one or more optoelectronic semiconductor chips. A semiconductor chip is, for example, configured as a light-emitting diode chip.

The wording "respectively" comprises, in particular, the wording "and/or".

The illumination instrument may be configured as a flashlight.

Two pixelated sources (for example, two pixelated emitters or two liquid-crystal displays with their own or common backlighting, or one pixelated emitter and one liquid-crystal display) may be provided, that have, for example, different spectra, in which case, for example, illumination by the two sources is carried out simultaneously or, for example, sequentially in one or more camera recordings.

A liquid-crystal display is, in particular, subdivided into pixels that can be driven individually to adjust an optical transparency of the individual pixels.

The above-described properties, features and advantages, and the way in which they are achieved, will become more clearly and readily comprehensible in conjunction with the following description of examples, which will be explained in more detail in connection with the drawings.

In what follows, the same references may be used for features which are the same.

Figure 1:
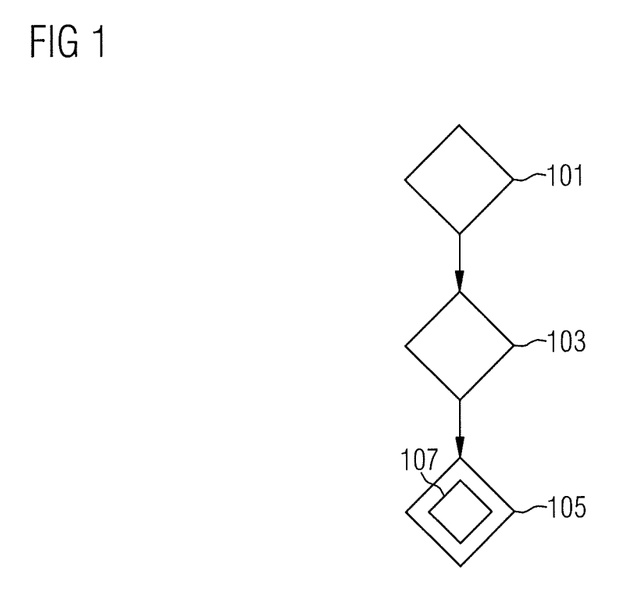
FIG. 1 shows a flowchart of a method of illuminating a face of a person.

FIG. 1 shows a flowchart of a method of illuminating a face of a person.

The method comprises the following steps:
recording 101 a first image, imaging the face, of the person,
determining 103 an eye region in the imaged face, and
illuminating 105 the face of the person, a first region, corresponding to the eye region determined, of the face being illuminated 107 such that dazzling of the eyes of the person can be reduced.

For example, the first image is recorded by an image sensor of a camera. A processing instrument determines, for example, the eye region in the face imaged in the first image.

An eye region of a face may, in particular, be determined by means of pattern recognition methods known per se.

For example, an illumination instrument is used to illuminate the face of the person. The illumination instrument comprises, for example, a pixelated emitter. The pixelated emitter has, in particular, a plurality of light-emitting pixels driven individually. For example, a drive instrument is provided to individually drive the light-emitting pixels.

The drive instrument drives, for example, light-emitting pixels that illuminate a first region corresponding to the eye region determined such that they illuminate the first region with a lower illuminance compared with the light-emitting pixels that illuminate a second region of the face, which is different from the first region.

This thus means, in particular, that a lower illuminance is used locally, i.e. in the first region, than for the rest of the face.

The effect advantageously achieved in this way is, in particular, that dazzling of the eyes of the person can be efficiently reduced or even avoided.

In particular, the first region is illuminated with illumination light having a spectral distribution whose global maximum lies at a wavelength which lies outside a wavelength range of 535 nm to 575 nm, in particular 515 nm to 590 nm, preferably 515 nm to 595 nm.

Because a human eye is particularly sensitive in the wavelength range of 535 to 575 nm, using a spectral distribution whose global maximum lies outside the range in which the human eye is particularly sensitive efficiently prevents the eyes from being dazzled.

Figure 2:
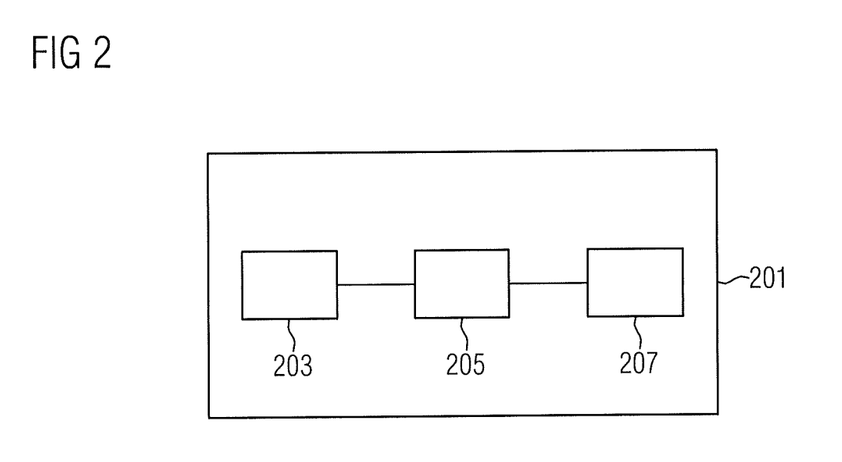
FIG. 2 shows an optoelectronic lighting device that illuminates a face of a person.

FIG. 2 shows an optoelectronic lighting device 201 that illuminates a face of a person.

The optoelectronic lighting device 201 comprises a recording instrument 203 that records a first image, imaging the face, of the person. The recording instrument 203 comprises, for example, an image sensor of a camera. This thus means that the image sensor of a camera is used to record the first image of the person.

The lighting device 201 furthermore comprises a processing instrument 205 that determines an eye region in the imaged face. For example, the processing instrument 205 comprises a processor. An eye region in a face of a person may be efficiently determined or recognized or detected by pattern recognition algorithms known per se. This is known per se so that further explanations will be refrained from.

The optoelectronic lighting device 201 furthermore comprises an optoelectronic illumination instrument 207 that illuminates the face of the person. The illumination instrument 207 is configured to illuminate a first region, corresponding to the eye region determined, of the face such that dazzling of the eyes of the person can be reduced.

For example, the illumination instrument 207 comprises a pixelated emitter. For example, the illumination instrument 207 comprises an optical imaging system that, for example, comprises a zoom objective and/or a liquid lens. By such optical elements, it is advantageously efficiently made possible to adjust a predetermined illuminance distribution for the illumination light. This thus means that an optoelectronic semiconductor chip, for example, a light-emitting diode chip that emits a fixed illuminance distribution may, for example, be used as the light source. The illuminance distribution may, however, be efficiently adjusted by the optical imaging system such that a local minimum of the imaged illumination light strikes the first region.

An optoelectronic semiconductor chip in the context of this disclosure is, for example, a light-emitting diode chip.

Figure 3:
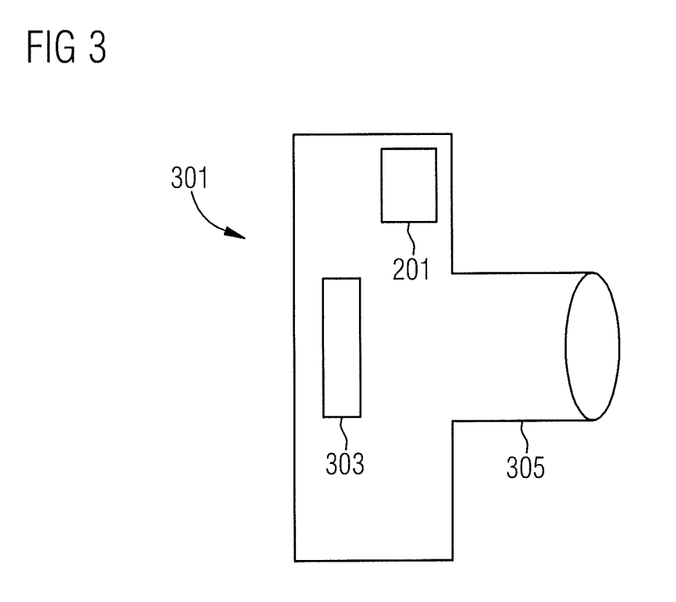
FIG. 3 shows a camera that records a face of a person.

FIG. 3 shows a camera 301 that records a face of a person.

The camera 301 comprises an image sensor 303 that records an image of a face of a person. The camera 301 furthermore comprises an objective 305 that images the face onto the image sensor 303.

The camera 301 furthermore comprises the optoelectronic lighting device 201 of FIG. 2. For the sake of clarity, the individual elements 203, 205, 207 are not shown in FIG. 3.

The lighting device 201 uses, in particular, the image sensor 303 to record the image of the face of the person.

Figure 4:
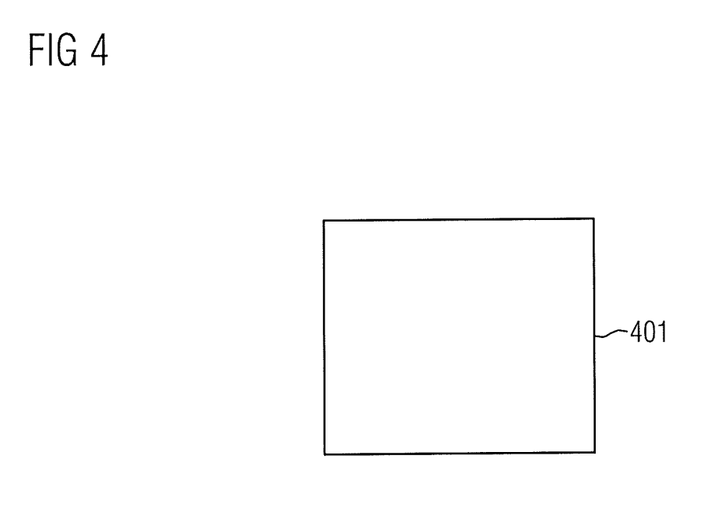
FIG. 4 shows a mobile terminal.

FIG. 4 shows a mobile terminal 401. The mobile terminal 401 is, for example, a cell phone.

The mobile terminal 401 comprises, for example, an optoelectronic lighting device (not shown). The mobile terminal 401 comprises, for example, a camera (not shown).

Figure 5:
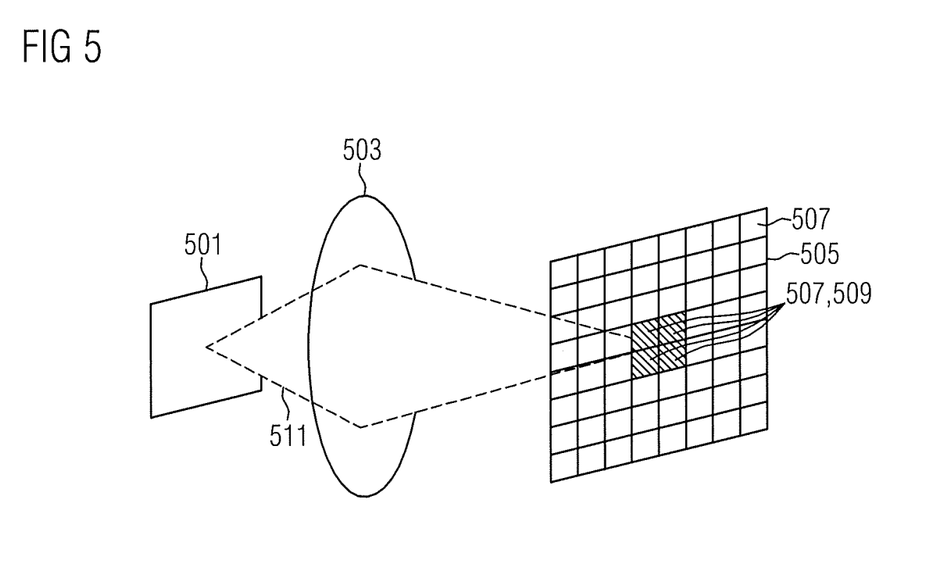
FIG. 5 shows an optoelectronic semiconductor chip, the illumination light of which is imaged by an optical imaging system.

FIG. 5 shows an optoelectronic semiconductor chip 501, which emits illumination light 511. The illumination light 511 is imaged into an image plane 505 by an optical imaging system 503. For illustration, the image plane 505 is subdivided into a grid having grid cells 507. By the optical imaging system 503, it is advantageously made possible to image the illumination light 511 such that the imaged illumination light-out as a local minimum. The local minimum is symbolically represented in FIG. 5 by grayed-out grid cells 509. This thus means that the local minimum of the imaged illumination light 511 lies in the grid cells with the reference 509.

This thus means that, to avoid or reduce dazzling of eyes, the image plane 505 lies in the face of the person to be photographed, the grid cells 509 lying in the eye region (first region) of the person.

To determine the precise position of the eye region of the person, initially a first image of the face of the person is recorded. This, for example, by an image sensor of a camera.

In the recorded first image, the eye region of the person is determined or detected. This, for example, is achieved by a processing instrument. For this determination or detection, the processing instrument uses, for example, pattern recognition algorithms known per se.

Subsequently, for example, a predetermined illuminance distribution is adjusted such that it has a local minimum that lies in the region of the face of the person corresponding to the eye region in the recorded face, i.e. the first region. This illuminance distribution is, for example, adjusted by the optical imaging system 503.

The optical imaging system 503 comprises, for example, a zoom object, i.e. in particular zoom optics, and one or more liquid lenses, i.e. in particular liquid optics.

For example, the optical imaging system has one or more fixed focal length objectives that can be displaced in the beam path by an adjustment unit such that different illuminance distributions can be produced.

For example, the optical imaging system 503 comprises an optical element that predefines a fixed illuminance distribution having a local minimum. In this example, the optical imaging system 503 in addition also comprises an adjustment unit that can displace this optical element in the beam path such that displacement of the optical minimum is brought about so that it is possible to achieve the result that the local minimum lies in the eye region of the person to be photographed.

Figure 6:
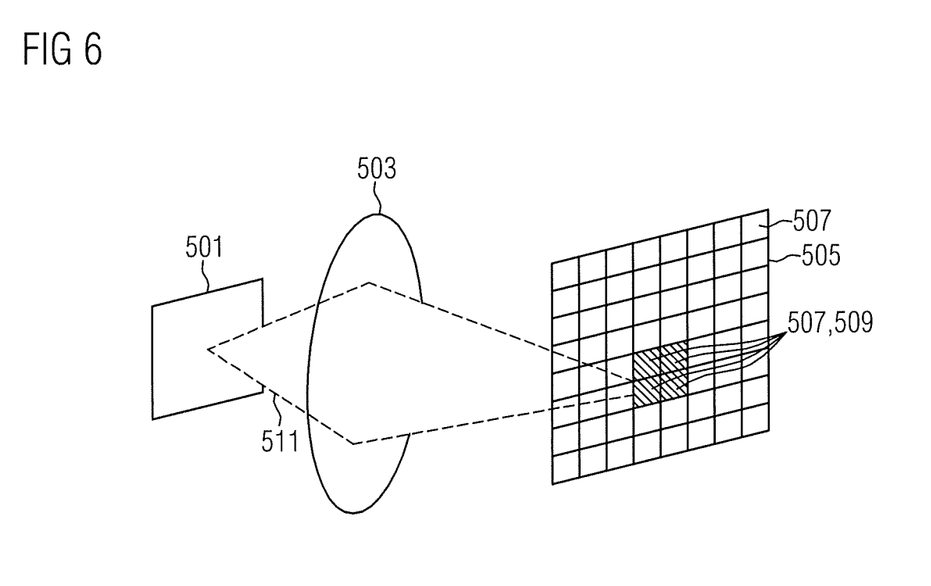
FIG. 6 shows the optoelectronic semiconductor chip of FIG. 5, the illumination light of which is imaged by the optical imaging system of FIG. 5 with a different illuminance distribution compared to the illuminance distribution according to FIG. 5.

FIG. 6 shows the same elements in the same arrangement as FIG. 5, although in this case there is the difference that the local minimum 509 lies at a different position in the image plane 505 than in FIG. 5.

Figure 7:
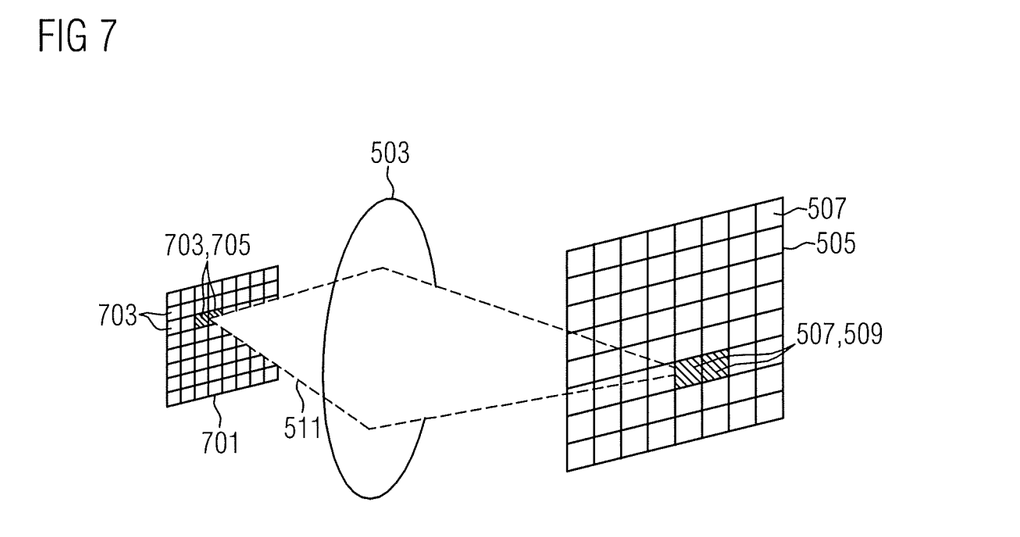
FIG. 7 shows a pixelated emitter.

FIG. 7 shows a pixelated emitter 701 having a plurality of light-emitting pixels 703. According to one example, a light-emitting pixel is a pn junction.

The light-emitting pixels 703 can be driven individually. For example, some of the light-emitting pixels are operated with a lower operating current than the rest of the light-emitting pixels. These light-emitting pixels therefore emit light with a lower intensity than the rest of the light-emitting pixels. Such light-emitting pixels 703 that therefore shine less brightly are symbolically represented here in gray and provided with the reference 705.

The light-emitting emitter 701 therefore provides illumination light 511 having a predetermined illuminance distribution that has a local minimum because of the less brightly shining light-emitting pixels 705. By the optical imaging system 503, the illumination light 511 is imaged into the image plane 505. The less brightly shining light-emitting pixels 705 are then correspondingly imaged into the grid cells with the reference 509.

Figure 8:
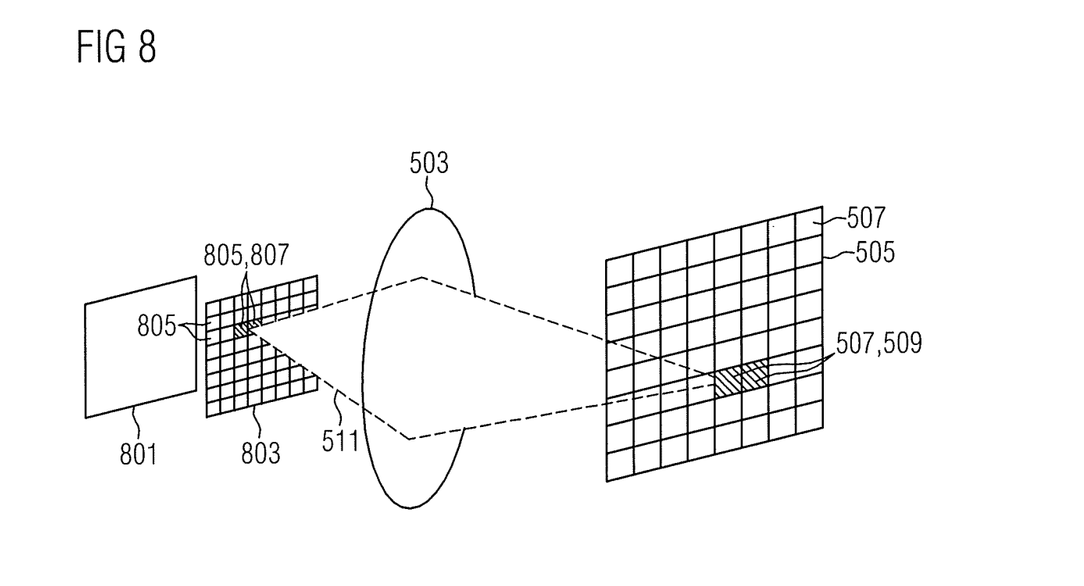
FIG. 8 shows a liquid-crystal display.

FIG. 8 shows a liquid-crystal display 803 illuminated by backlighting 801. The liquid-crystal display 803 is subdivided into pixels 805. The pixels 805 can be driven individually to adjust a particular optical transparency for each pixel 805. For example, two of the pixels 805 have a lower optical transparency, i.e. are darkened. These darkened pixels are represented in gray and are provided with the reference 807.

Thus, the liquid-crystal display 803 therefore will emit illumination light 511 which, because of the darkened pixels 807, has an illuminance distribution having a local minimum.

The illumination light 511 is imaged into the image plane 505 by the optical imaging system 503. Correspondingly, the darkened pixels 807 are then imaged into the grid cells 509.

Figure 9:
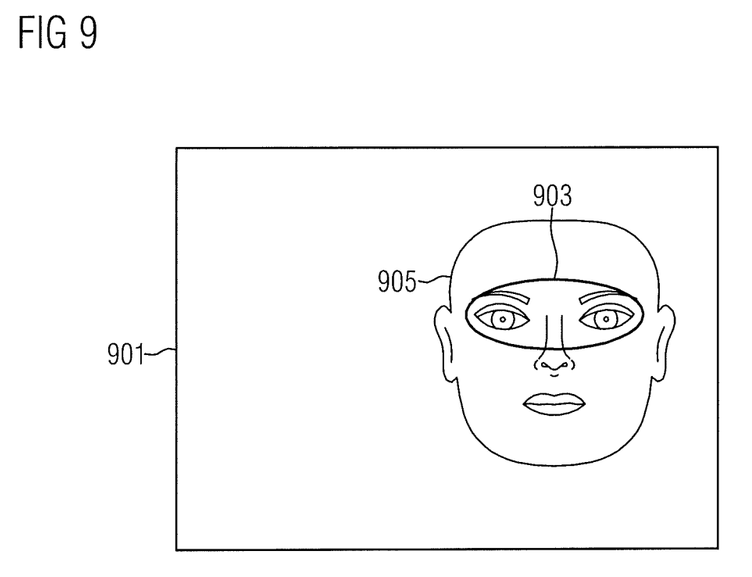
FIG. 9 shows an eye region determined in a first image.

FIG. 9 shows a first recorded image 901 of a face 905 of a person. The recorded image 901 corresponds to a camera field of a camera by which the image 901 has been recorded.

In the face of the person, an eye region 903 has been determined or detected.

Figure 10:
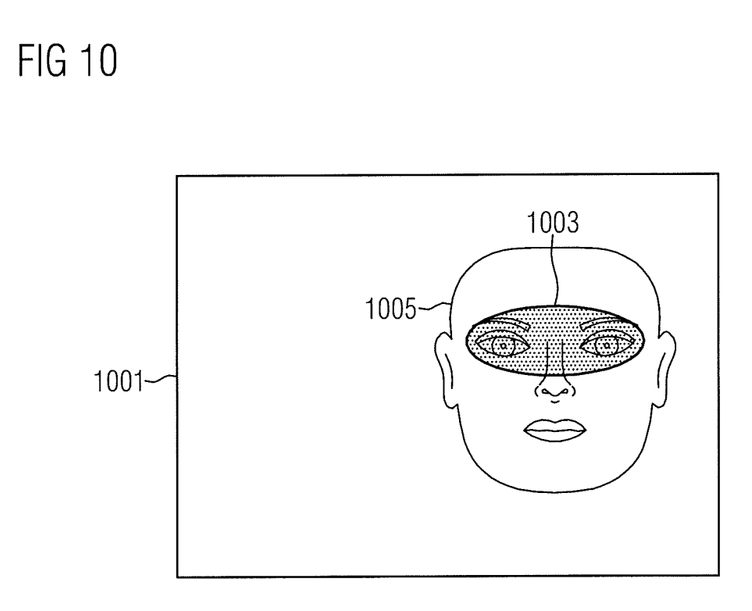
FIG. 10 shows adapted illumination for the eye region.

FIG. 10 shows a recording region 1001 in the real world corresponding to the first image 901 of FIG. 9. The recording region 1001 comprises the real face 1005 of the person to be photographed, the real face 1005 corresponding to the imaged face 905. A first region corresponding to the eye region 903 determined is denoted by the reference 1003.

The first region 1003 is, for example, illuminated with illumination light having a reduced light intensity compared to a remaining region of the recording region 1001.

This thus means that the recording region is illuminated less brightly at the position of the first region 1003 than the rest of the recording region. For example, the first region 1003 is illuminated with illumination light having a spectral distribution whose global maximum lies at a wavelength that lies outside a wavelength range of 535 nm to 575 nm, in particular 515 nm to 590 nm, preferably 515 nm to 595 nm.

Figure 11:
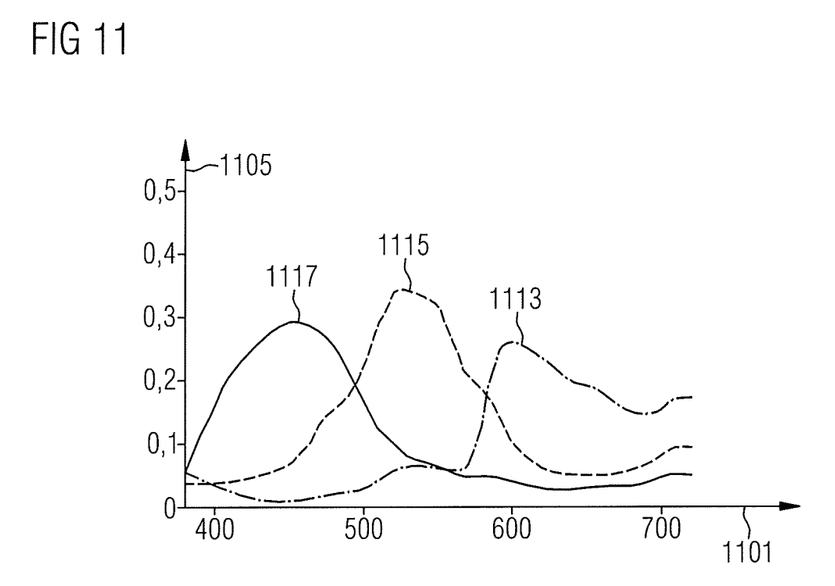
FIG. 11 shows graphical profiles of a camera sensitivity as a function of a wavelength.

FIG. 11 shows graphical profiles of normal spectral value functions and a quantum efficiency of a camera sensor as a function of the wavelength.

The reference 1101 indicates the abscissa that specifies the wavelength in nanometers.

The reference 1105 indicates the ordinate that specifies a camera sensitivity in arbitrary units. The camera sensitivity is based, in particular, on a sensitivity of the image sensor, on filters optionally present in the beam path, and on the optics used.

The reference 1113 indicates a graphical profile of the camera sensitivity for red light. The reference 1115 indicates a graphical profile of the camera sensitivity for green light. The reference 1117 indicates a graphical profile of the camera sensitivity for blue light.

Red, green and blue mean red, green and blue in the sense of the RGB color space.

Figure 12:
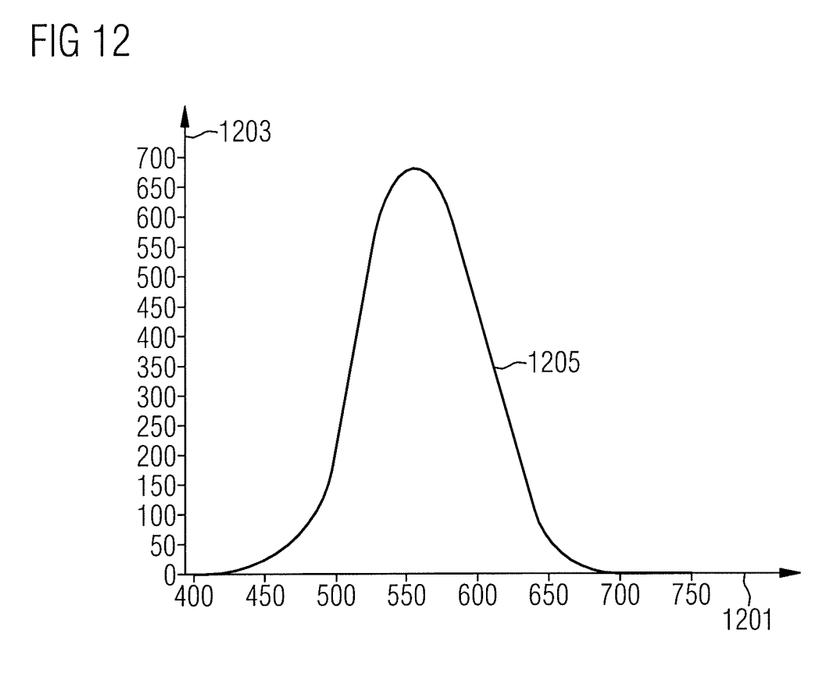
FIG. 12 shows a graphical profile of a spectral eye sensitivity.

FIG. 12 shows a graphical profile of a spectral eye sensitivity of a human eye.

The reference 1201 indicates the abscissa that specifies the wavelength in nanometers. The reference 1203 indicates the ordinate that specifies the eye sensitivity in lm/W. The reference 1205 indicates the graphical profile of the eye sensitivity.

It can be seen clearly that the eye sensitivity 1205 has a maximum at about 555 nm. When, for illumination light intended to illuminate the eyes of a person, a spectral distribution is used whose global maximum lies outside 535 nm to 575, in particular 515 nm to 590 nm, preferably 515 nm to 595 nm, this efficiently prevents the human eye from being dazzled by the illumination light.

In summary, I provide an efficient means to efficiently tackle the problem that flashlights of cameras, cell phones or video cameras often cause dazzling of the persons being photographed. In general, the cause of dazzling is an excessively high luminance of the flashlight.

For example, the eye region of the person to be photographed may be determined. This, in particular, by a first image of the face of the person initially being recorded, the eye region being detected or determined in the first image.

The first image may also be referred to as a pre-image. For example, according to one example the first image is recorded under ambient light. For example, the first image is recorded under IR light and/or UV light. For example, the first image is illuminated with a reduced illuminance.

Then, in particular, an image analysis of the recorded pre-image is carried out to detect the eye region.

A recording of the image, or a plurality, of the person to be photographed or persons to be photographed may then be recorded under an optimized flashlight, in general optimized illumination. For example, a local reduction of the illuminance is carried out by imaging a pixelated source (pixelated emitter) and/or corresponding optics (optical imaging system). For example, a local modification of the flashlight spectrum, in general spectral distribution of the illumination light, is carried out. For example, global adaptation of the flashlight spectrum, in general the spectral distribution of the illumination light, is carried out.

For example, a computer correction of the recorded image under an optimized flashlight is carried out in relation to the optimization or adaptations carried out.

For the eye region, in particular, a modification of an illumination light spectrum is provided. This, in particular, away from a maximum eye sensitivity at 555 nm to, for example, 510 nm. This is possible, in particular, since in general a spectral reflectivity of the scene is narrowly limited in the eye region. A spectral reflectivity in the eye region is, for example, composed of a corresponding reflectivity of the skin color, the hair color and the eye color.

Furthermore, in general the exact spectrum is not important for color rendering, but rather much more a summed spectral power in particular wavelength intervals.

In particular, modification of the spectrum is also possible since a color impression in the eye region may, for example, be partly extrapolated from a color impression in the adjacent regions.

Modification of the spectrum, as described above, is advantageous in particular since spectral components that give a high detector signal now lie outside a maximum of the eye sensitivity.

One possible implementation is, for example, a combination of two pixelated sources (for example, two pixelated emitters, or two liquid-crystal displays, or one pixelated emitter and one liquid-crystal display) that have different spectra, in which case illumination by the two sources is carried out simultaneously or sequentially in one or more camera recordings.

A spectral distribution of the illumination light is controlled such that a high detector signal can be achieved, i.e. high RGB values, although at the same time an illuminance remains low, or a luminance of the flashlight module is low.

The spectrum of the illumination light is denoted below by $E_E(\lambda)$. The illuminance will be denoted below as $E_V$.

The following applies:

$$\begin{Bmatrix} R \\ G \\ B \end{Bmatrix} n, \text{raw} = \int \begin{Bmatrix} r(\lambda) \\ g(\lambda) \\ b(\lambda) \end{Bmatrix} \cdot q_{e,n}(\lambda) \cdot (E_{e,amb}(\lambda) + E_{e,flash}(\lambda)) d\lambda$$

$$\text{Illuminance } E_v = \int V(\lambda) E_E(\lambda) d\lambda.$$

$E_{e,ambs}(\lambda)$ denotes the illuminance of the ambient light ("amb" stands for "ambient").

$E_{e,flash}(\lambda)$ denotes the illuminance of the illumination instrument ("flash" means "flashlight").

$q_{e,n}(\lambda)$ denotes the spectral reflectivities of objects of the environment.

$r(\lambda)$
$g(\lambda)$ denote the camera sensitivities for red, green and blue light, as are shown for instance by
$b(\lambda)$
way of example in FIG. 11.

$$\begin{Bmatrix} R \\ G \\ B \end{Bmatrix} n,$$

raw denote the raw camera signals for red, green and blue light. The raw camera signals may, for example, be present in bit values of from 0 to 255.

High values for RGB are thus sought, with at the same time low values for $E_V$. In particular, a green peak of the illumination light, i.e. a global maximum of the spectral distribution, lies outside the wavelength range of 535 nm to 575 nm.

Although my methods, devices, cameras and mobile terminals have been illustrated and described more closely in detail by preferred examples, this disclosure is not restricted in this way by the examples disclosed, and other variants may be derived therefrom by those skilled in the art without departing from the protective scope of the appended claims.

This application claims priority of DE 10 2016 104 383.4, the subject matter of which is incorporated herein by reference.

The invention claimed is:

1. A method of illuminating a face of a person comprising:
   recording a first image imaging the face of the person,
   determining an eye region in the imaged face, and
   illuminating the face of the person, a first region corresponding to the eye region determined, of the face being illuminated such that dazzling of the eyes of the person can be reduced, wherein the first region is illuminated with a spectral distribution whose global maximum lies at a wavelength outside a wavelength range of 535 nm to 575 nm, and a spectral distribution of the illumination light is controlled such that a high detector signal is achieved while at the same time an illuminance is low, or a luminance of the flashlight module is low, wherein the illumination of the first region is an illumination within the visible range.

2. The method according to claim 1, wherein the first region of the face is illuminated with a lower illuminance than a second region of the face, which is different from the first region.

3. The method according to claim 1, wherein an optical imaging system is arranged in a beam path of illumination light corresponding to the illumination, the illumination light being imaged onto the face of the person by the optical imaging system such that a local minimum of the imaged illumination light lies in the first region.

4. The method according to claim 1, wherein the recording of the first image comprises illumination of the face by UV light and/or IR light.

5. The method according to claim 1, wherein the recording of the first image imaging the face of the person comprises a compilation of a three-dimensional profile of an environment comprising the person, the eye region being determined in the three-dimensional profile.

6. An optoelectronic lighting device that illuminates a face of a person comprising:
   a recording instrument that records a first image, imaging the face, of the person,
   a processing instrument that determines an eye region in the imaged face, and
   an optoelectronic illumination instrument that illuminates the face of the person, the illumination instrument configured to illuminate a first region corresponding to the eye region determined of the face such that dazzling of the eyes of the person can be reduced and such that the illumination of the first region is an illumination within the visible range, wherein the illumination instrument is configured to illuminate the first region with a spectral distribution whose global maximum lies at a wavelength outside a wavelength range of 535 nm to 575 nm, and the illumination instrument is configured to control a spectral distribution of the illumination light such that a high detector signal is achieved while at the same time an illuminance is low, or a luminance of the flashlight module is low.

7. The optoelectronic lighting device according to claim 6, wherein the illumination instrument is configured to illuminate the first region of the face with a lower illuminance than a second region of the face, which is different from the first region.

8. The optoelectronic lighting device according to claim 6, wherein the illumination instrument comprises a pixelated emitter having a plurality of individually drivable light-emitting pixels, and a drive instrument that individually drives the light-emitting pixels, which is configured to drive light-emitting pixels that illuminate the first region such that dazzling of the eyes of the person by the light-emitting pixels that illuminate the first region can be reduced.

9. The optoelectronic lighting device according to claim 6, wherein the illumination instrument comprises a liquid-crystal display that can be illuminated by backlighting.

10. The optoelectronic lighting device according to claim 6, wherein an optical imaging system is arranged in a beam path of illumination light corresponding to the illumination, the imaging system being configured to image the illumination light onto the face of the person such that a local minimum of the imaged illumination light lies in the first region.

11. The optoelectronic lighting device according to claim 6, wherein the imaging system comprises one or more of optical elements: zoom objective and liquid lens that adjusts different focal lengths.

12. The optoelectronic lighting device according to claim 6, wherein the illumination instrument is configured to illuminate the face of the person by UV light and/or IR light so that the first image can be recorded under UV light and/or IR light.

13. The optoelectronic lighting device according to claim 6, wherein the recording instrument is configured to compile a three-dimensional profile of an environment comprising the person, the processing instrument being configured to determine the eye region in the three-dimensional profile.

14. A camera that records a face of a person comprising:
   an objective that images the face onto an image sensor, and
   the optoelectronic lighting device according to claim 6.

15. A method of illuminating a face of a person comprising:
   recording a first image imaging the face of the person,
   determining an eye region in the imaged face, and
   illuminating the face of the person, a first region corresponding to the eye region determined, of the face being illuminated such that dazzling of the eyes of the person can be reduced, wherein the first region is illuminated with a spectral distribution whose global maximum lies at a wavelength outside a wavelength range of 535 nm to 575 nm, and a spectral distribution of the illumination light is controlled such that a high detector signal is achieved while at the same time an illuminance is low, or a luminance of the flashlight module is low, wherein a green peak of the illumination light lies outside the wavelength range of 535 nm to 575 nm.

16. An optoelectronic lighting device that illuminates a face of a person comprising:
   a recording instrument that records a first image, imaging the face, of the person,
   a processing instrument that determines an eye region in the imaged face, and
   an optoelectronic illumination instrument that illuminates the face of the person, the illumination instrument configured to illuminate a first region corresponding to the eye region determined of the face such that dazzling of the eyes of the person can be reduced and such that a green peak of the illumination light lies outside the wavelength range of 535 nm to 575 nm, wherein the illumination instrument is configured to illuminate the first region with a spectral distribution whose global maximum lies at a wavelength outside a wavelength range of 535 nm to 575 nm, and the illumination instrument is configured to control a spectral distribution of the illumination light such that a high detector signal is achieved while at the same time an illuminance is low, or a luminance of the flashlight module is low.

17. A camera that records a face of a person comprising:
an objective that images the face onto an image sensor, and
the optoelectronic lighting device according to claim 16.

* * * * *